United States Patent
Pecnik et al.

(10) Patent No.: US 7,083,541 B2
(45) Date of Patent: Aug. 1, 2006

(54) AXLE DRIVE BLOCK WITH A DIFFERENTIAL LOCK

(75) Inventors: Hermann Pecnik, Nestelbach (AT); Helmut Stelzl, Leutschach (AT)

(73) Assignee: Magna Steyr Fahrzeugtechnik AG & Co. KG, Graz (AT)

( * ) Notice: Subject to any disclaimer, the term of this patent is extended or adjusted under 35 U.S.C. 154(b) by 96 days.

(21) Appl. No.: 10/503,798

(22) PCT Filed: Feb. 5, 2003

(86) PCT No.: PCT/AT03/00033

§ 371 (c)(1),
(2), (4) Date: Aug. 5, 2004

(87) PCT Pub. No.: WO03/066362

PCT Pub. Date: Aug. 14, 2003

(65) Prior Publication Data

US 2005/0049103 A1 Mar. 3, 2005

(30) Foreign Application Priority Data

Feb. 8, 2002 (AT) ................................. GM80/2002

(51) Int. Cl.
*F16H 48/06* (2006.01)
(52) U.S. Cl. ....................... 475/221; 475/248; 475/249; 475/250; 475/223; 475/231; 475/323; 475/326
(58) Field of Classification Search ................. 475/223, 475/248, 250, 231, 221, 205, 323, 326; 192/70.23, 192/93 A
See application file for complete search history.

(56) References Cited

U.S. PATENT DOCUMENTS

| | | | | | |
|---|---|---|---|---|---|
| 3,330,169 | A | * | 7/1967 | Carrico et al. | 475/240 |
| 3,344,688 | A | * | 10/1967 | Frost | 475/234 |
| 3,477,302 | A | * | 11/1969 | Webb | 74/142 |
| 3,492,890 | A | * | 2/1970 | Gardner et al. | 475/221 |
| 4,290,321 | A | * | 9/1981 | Wilson | 475/235 |
| 4,757,727 | A | * | 7/1988 | Teraoka et al. | 475/85 |
| 4,978,329 | A | * | 12/1990 | Yasui et al. | 475/84 |
| 5,059,160 | A | * | 10/1991 | Raniero | 475/234 |
| 5,902,206 | A | * | 5/1999 | Oda et al. | 475/221 |
| 6,053,293 | A | * | 4/2000 | Sato et al. | 192/35 |
| 6,935,983 | B1 | * | 8/2005 | Pecnik | 475/249 |
| 2003/0171184 | A1 | * | 9/2003 | Wige | 475/248 |

FOREIGN PATENT DOCUMENTS

| | | | |
|---|---|---|---|
| DE | 4418891 A1 | * | 1/1995 |
| JP | 03000529 A | * | 1/1991 |

\* cited by examiner

*Primary Examiner*—Charles A. Marmor
*Assistant Examiner*—Justin K. Holmes

(74) *Attorney, Agent, or Firm*—Bachman & LaPointe, P.C.

(57) ABSTRACT

An axle drive block for a motor vehicle, comprising a first and a second differential in a driven housing. Both of the differentials are coaxially aligned planetary spur gears, the sun wheels of which are drivably connected to the semiaxes of the first driven axle. The planet wheels of both differentials mesh the joint ring gear of the sun wheels. In order to lock the interaxle differential, the housing is provided with a first striking surface interacting with a second striking surface which is pressed thereto by ball ramps.

7 Claims, 5 Drawing Sheets

AXLE DRIVE BLOCK WITH A DIFFERENTIAL LOCK

BACKGROUND OF THE INVENTION

The invention involves an axle-drive block for motor vehicles having a first and a second driven axle which contains a first and a second differential in a housing driven by an engine/transmission block, the first differential distributing the torque fed to it between a first half axle of the first driven axle and the second differential, and the second differential further distributing the torque fed to it between a second half axle of the first driven axle and a power take-off for the second driven axle, the two differentials being spur-gear-type planetary gears with parallel axes, the sun wheels of which are in each case connected in terms of drive to the half axles of the first driven axle, and planet wheels of the two differentials meshing with the common ring gear of said planetary gears, one planet carrier being connected in a rotationally fixed manner to the housing accommodating the two differentials and the other planet carrier being connected in terms of drive to the power take-off for the second driven axle.

An axle-drive block of this type is disclosed in DE 44 18 891 C2. In the latter, owing to the particular design and arrangement of the two differentials, optimum adaptation of the moment distribution ratio is achieved with a minimum outlay on construction. Provided between the driven housing, which contains the two differentials, and the power take-off for the second driven axle is a fluid friction clutch as a longitudinal differential lock. The latter is not only complicated and bulky (for which reason it has to be driven via a hollow shaft and arranged outside the housing of the two differentials), it also has the disadvantage of not being suitable for interaction with brake-force and slip-limiting systems (ABS, ESP). The fluid friction clutch is a lock sensing the rotational speed.

EP 94 870 A1 discloses an axle-drive block, in which two bevel gear differentials are connected in series and, in the first differential, the moment for just one side of the first driven axle is branched off. To totally lock the longitudinal differential, the cages of the two bevel gear differentials can be connected by means of a claw clutch. With this arrangement, neither the desired moment distribution nor a symmetrically acting locking can be obtained. In particular, with only a partial locking by means of friction, an asymmetrical distribution of torque with respect to the longitudinal axis of the vehicle would be produced, which is not allowed.

For compatibility with ABS or ESP and for other reasons concerned with driving dynamics, a torque-sensing lock which carries out its task without an external control action is desired. A lock of this type is specified, for example, also in a torsen differential of particular design, but has an unfavorable behavior in terms of wear.

It is therefore the object of the invention to provide, with a minimum outlay on construction, an automatic locking of the longitudinal differential, with it being possible for the automatic locking which can be obtained to be structurally influenced in such a manner that it is adapted to the requirements in terms of driving dynamics.

SUMMARY OF THE INVENTION

According to the invention, the object is achieved by providing a friction clutch formed between a planet carrier of a second differential and a housing, wherein the friction clutch comprising an axially normal first frictional surface on an inner wall of the housing and a ring which is operatively connected to the planet carrier of the second differential and has a second frictional surface, wherein the ring is rotatable with respect to the second planet carrier and, during rotation, the distance between the first and second frictional surfaces changes.

The locking thus takes place by means of friction, gradually. Owing to e), only the central differential is lockable (i.e. the locking action between the first and second driven axle) without the moment distribution between the two wheels of the first driven axle becoming asymmetrical. Because it requires little space, the friction clutch can be accommodated within the housing and can be connected into the power flux over the shortest possible distance (without the interconnection of shafts whose twistability may result in oscillations). The operative connection between the planet carrier and the ring, via which the torque is conducted to the second driven axle, renders the lock torque-sensing, as a result of which it is self-controlling without external intervention and is ABS- and ESP-compatible. The desired locking behavior can be represented within wide limits by means of the structural design of the operative connection.

In one preferred embodiment, the second planet carrier and/or the ring has an end surface with ramps rising in the axial direction. The desired locking behavior is produced by means of the shape and inclination of the ramps. In particular, the ramps may rise from a neutral position at different inclinations in both circumferential directions (i.e. in a different direction of rotation). This enables the locking behavior to be designed differently in the traction-mode than in the overrun mode. It may also be said that, in one direction of rotation, a dropping ramp is followed by a rising ramp.

There are various possibilities for the structural design of the ramps. For reasons of symmetry, at least two ramps distributed over the circumference are provided in every case.

In one possible embodiment, the second planet carrier and the ring has an end surface with ramps rising in the axial direction. During mutual rotation, the ramps of the two parts slide on each other and thus determine the axial position of the ring. The mechanical friction between the two ramps means that the action responds only upon a certain "sensed" torque.

In another possible embodiment, the second planet carrier and/or the ring has a planar end surface with depressions which form ramps and accommodate rolling bodies. The action therefore occurs virtually without any friction and in a more sensitive manner. In addition, the space required and the outlay on manufacturing are thus smaller.

In a development of the invention, in addition there are first and second clutch disks between the first and the second friction surface, of which the first clutch disks are connected in a rotationally fixed and axially displaceable manner to the inner wall of the housing and the second clutch disks are connected in a rotationally fixed and axially displaceable manner to the ring. This enables relatively high locking moments to be obtained and to manage with lower locking forces. Another possibility of increasing the locking action with the minimal additional amount of space being required involves providing at least one of the frictional surfaces with a friction lining.

BRIEF DESCRIPTION OF THE DRAWINGS

The invention will be described and explained below with reference to figures, in which.

DETAILED DESCRIPTION

Figure 1:
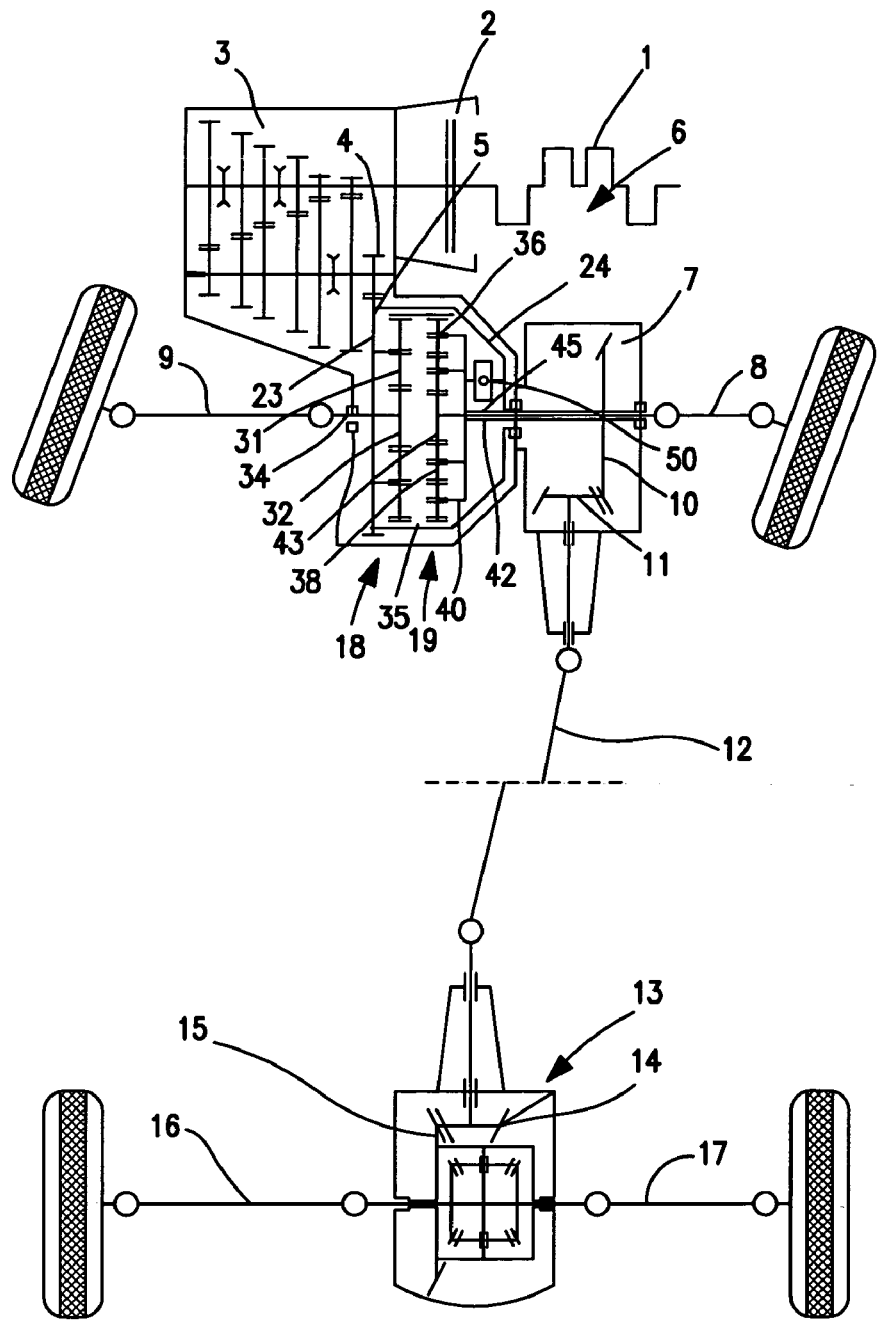
FIG. 1 shows a diagrammatic view of the entire drive train of a vehicle together with the axle-drive block according to the invention.

In the all-wheel-drive motor vehicle illustrated in FIG. 1, the engine is referred to by 1, the clutch by 2, and the manual transmission by 3. The transmission 3 ends in a driven gearwheel 4 which meshes with a large driving gearwheel 5. The driving gearwheel 5 is already part of the axle-drive block 6. The latter is adjoined by a power take-off 7 for the rear axle drive and by a right and a left half axle 8, 9 for the drive of the front wheels. Located in the interior of the power take-off 7 is a pair of bevel gears 10, 11, and the torque for the rear axle is fed via a propeller shaft 12 to a, for example, conventional differential transmission 13, in which the half axles 16, 17 of the rear wheels are driven in a known manner via a pair of bevel gears 14, 15. A first and a second planetary gear 18, 19 are located in the interior of the axle-drive block 6 and will be described in greater detail below.

Figure 2:
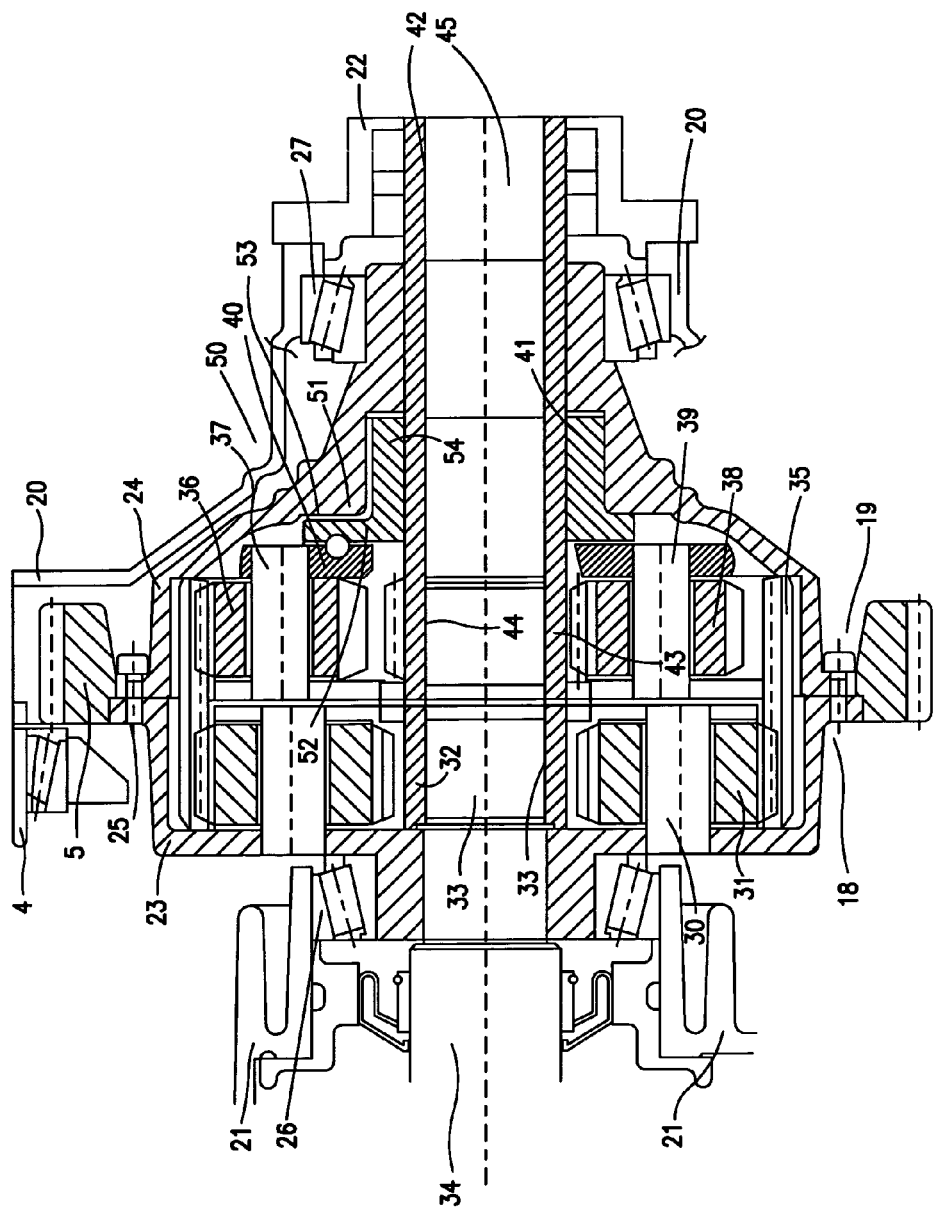
FIG. 2 shows an axial section through the double differential of FIG. 1.

The rotating part of the axle-drive block illustrated in FIG. 2 is, starting from the driving gearwheel 5, a driven housing 22 which contains the two planetary gears 18, 19. The housing 22 comprises two housing parts 23, 24 which are jointly clamped together here to the driving gearwheel 5 by means of threaded bolts 25. The axial position of the joint between the two housing parts can be established in accordance with external requirements; either the two housing parts can have the same depth or one of the housing parts is a flat cover and the other is a deep bell.

The first housing part 23 is at the same time the planet carrier of the first differential transmission 18 and, for example, is connected fixedly to the bell-shaped housing part 24 by means of the threaded bolts 25. The two together thus form a rigid part which is mounted rotatably in the housing 20, 21 by means of bearings 26, 27. This first planetary gear 18 also includes planet wheels 31 which can rotate about axes 30, and a sun wheel 32, which is connected by means of a wedge-shaped toothing 33 to the left output shaft 34 to which the half axle 9 (FIG. 1) is connected.

A ring gear 35 surrounds the planet wheels 31 of the first planetary gear 18 and is at the same time also the ring gear of the second planetary gear 19. It meshes with the outer planet wheels 36 of the second planetary gear 19, which planet wheels are mounted on spindles 37 which, for their part, are fastened in the second planet carrier 40. The first planet wheels 36 also mesh with second planet wheels 38 which are likewise mounted on the planet carrier 40 on spindles 39. The second planet wheels 38 mesh with a sun wheel 43 which is connected via a wedge-shaped toothing 44 to the right output shaft 45. The latter leads via the right axle-drive shaft 8 (FIG. 1) to the right front wheel. Reference is made in this respect to DE 44 18 891.

The power flux runs as follows: the torque acting on the housing 24 is firstly divided in the first planetary gear 18 between the sun wheel 32, and hence the left, front axle drive shaft 9, and the ring gear 35 which produces the connection between the first and second planetary gear. In the second planetary gear 19, the torque is distributed via the planet wheels 36, 38 to, on the one hand, their planet carriers 40, and hence to the power take-off 7 for the rear wheels, and, on the other hand, to the sun wheel 43 and hence to the right half-axle 8 of the front wheel drive.

According to the invention, a friction clutch 50 is now provided between the planet carrier 40 of the second differential 19 and the housing 24 (FIG. 1), the friction clutch acting between an axially normal first frictional surface 51 and a second frictional surface 53 formed on a ring 52. The ring 52 is operatively connected to the planet carrier 40 and at the same time produces the driving connection between the latter (40) and the hollow shaft 42 leading to the drive of the second axle. The a hub 54 is connected via a wedge-shaped toothing 41 to a hollow shaft 42 which leads into the power take-off 7 for the rear axle (FIG. 1).

Figure 3:
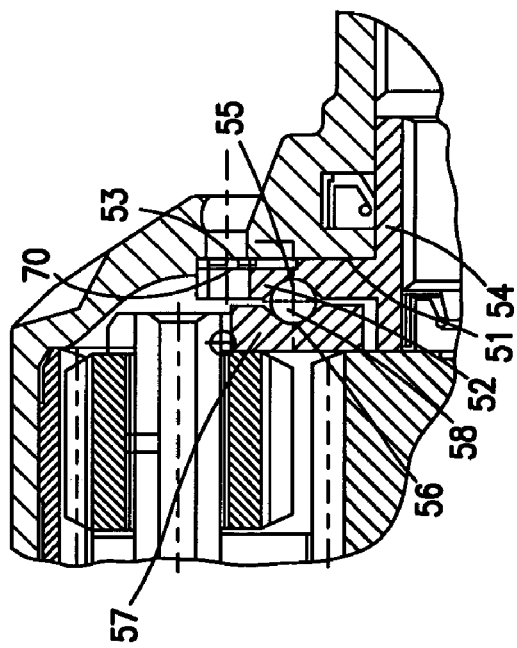
FIG. 3 shows detail III in FIG. 2 in a first embodiment.

FIG. 3 shows the operative connection in more detail. The ring 52 has a hub 54 sitting on the hollow shaft 42 and, on the side facing away from the frictional surface 51, 53, at least two depressions 55 distributed uniformly on the circumference. In the exemplary embodiment depicted, the disk 57 of the planet carrier 40 has depressions 56 just like this. Balls 58 are situated between the depressions 55, 66. There may be, but does not have to be, a friction lining 70.

Figure 4:
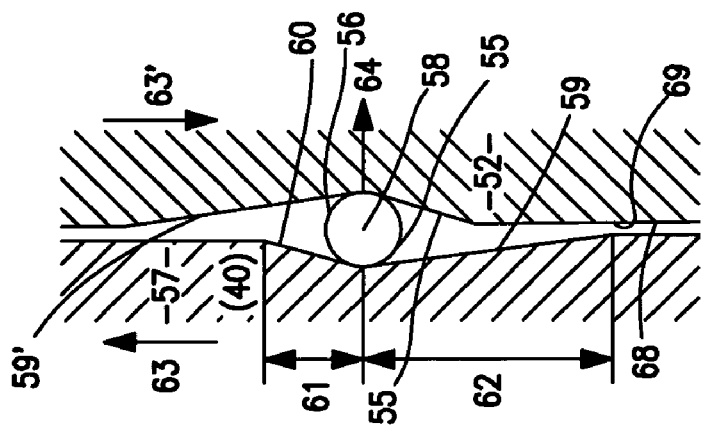
FIG. 4 shows a circumferential section according to IV—IV in FIG. 3.

It can be seen in FIG. 4 that the depressions 55, 56 in each case form a first ramp (59, 59') and a second ramp (60, 60') 59, 60. Since their lengths 61, 62 differ, the inclination of the two ramps also differs. During a relative movement of the ring 52 and disk 57 corresponding to the traction mode and forward travel and arrows 63, 63", the ball 58 will exert a force 64 on the ring with which it is pressed with its second frictional surface 53 against the first frictional surface 51 (FIG. 3) and thus retards the relative movement between ring 52 and housing part 24. During a relative movement in the opposite direction during overrun mode forward or during traction mode rearward, the steeper ramps 60, 60' come into effect and the torque transmitted via the ball 58 brings about a smaller press-on force between the frictional surfaces 51, 53.

Figure 5:
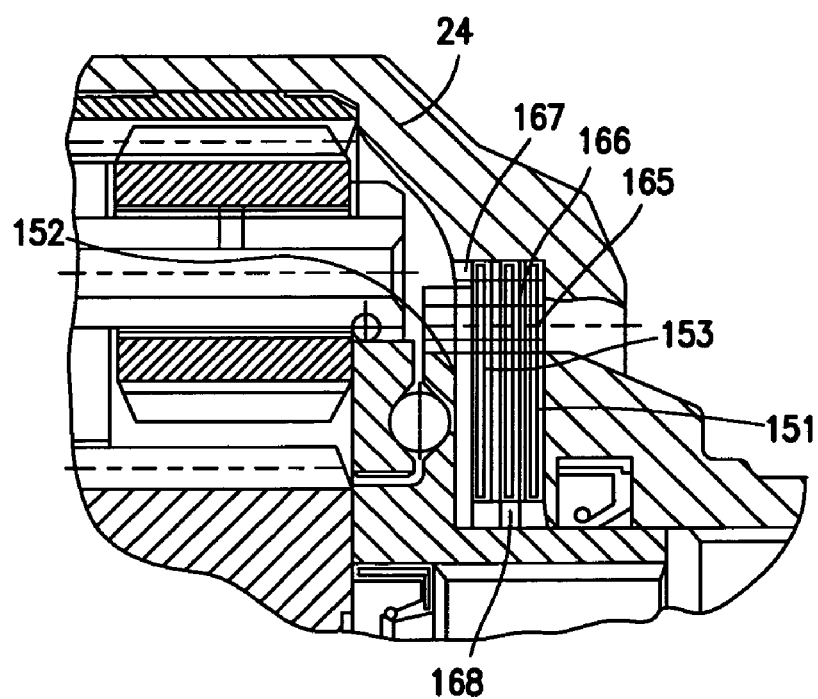
FIG. 5 shows detail III in FIG. 2 in a second embodiment.

In FIG. 5, first and second clutch disks 165, 166 are provided between the first frictional surface 151 and the second frictional surface 153 in order to increase the friction with the same press-on pressure. The former (165) are connected to the housing 24 in a rotationally fixed and axially displaceable manner by means of teeth 167 therein; the latter (166) are connected to the hub 54 via teeth 168. Springs which are optionally present cannot be seen.

Figure 7:
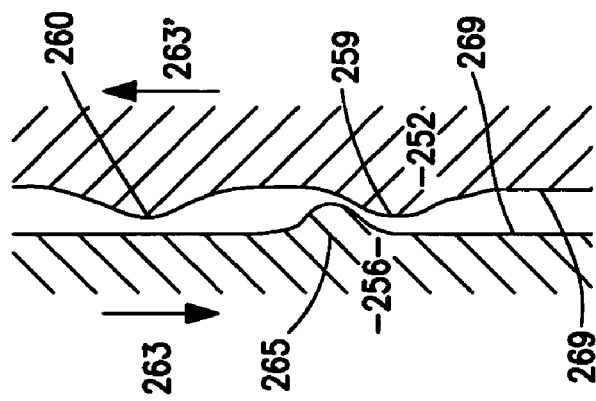
FIG. 7 shows a circumferential section according to VII—VII in FIG. 6.
Figure 6:
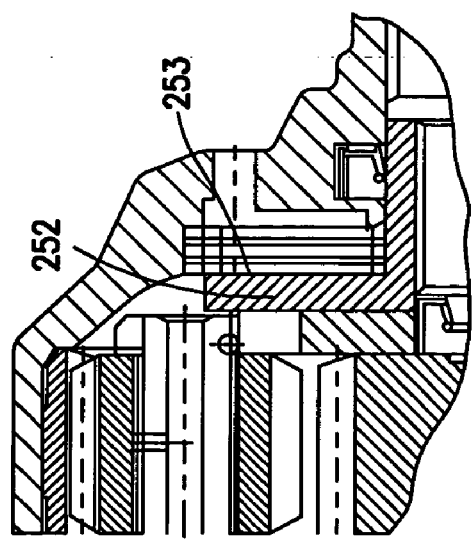
FIG. 6 shows detail III in FIG. 2 in a third embodiment.

FIG. 6 differs from FIG. 3 by the fact that, instead of the depressions and rolling bodies, connecting links which slide on each other are provided, as can better be seen in the circumferential section in FIG. 7. The disk 256 of the planet carrier 40 has two or more hump-shaped ramps 265 which are distributed over the circumference and come into contact along their generatrices with the ramps 259, 260, which may again be shaped differently. The ramps 265, 259, 260 protrude in the axial direction from the end surfaces 268, 269 of the ring 252 and disk 256.

The invention claimed is:

1. An axle-drive block for a motor vehicle comprises a first and a second driven axle which contains a first and a second differential in a housing driven by an engine/transmission block, wherein
   a) the first differential distributes the torque fed to it between a first half axle of the first driven axle and a second differential, and b) the second differential further distributes the torque fed to it between a second half axle of the first driven axle and a power take-off for the second driven axle, and
c) the two differentials being spur-gear-type planetary gears with parallel axes, having sun wheels which are in each case connected in terms of drive to the half axles of the first driven axle, and planet wheels of the respective differentials meshing with a common ring gear of said planetary gears,
d) a planet carrier of the first differential being connected in a rotationally fixed manner to the housing accommodating the two differentials, and a planet carrier of the second differential being connected in terms of drive to the power take-off for the second driven axle, and wherein
e) a friction clutch is formed between the planet carrier of the second differential and the housing,
f) the friction clutch comprising an axially normal first frictional surface on an inner wall of the housing and a ring which is operatively connected to the planet carrier (40) of the second differential and has a second frictional surface,
g) the ring being rotatable with respect to the second planet carrier and, during rotation, the distance between the first frictional surface and the second frictional surface changing.

2. The axle-drive block as claimed in claim 1, wherein at least one of the second planet carrier and the ring has an end surface with ramps rising in the axial direction.

3. The axle-drive block as claimed in claim 1, wherein at least one of the second planet carrier and the ring has a planar end surface with depressions which form ramps and accommodate rolling bodies.

4. The axle-drive block as claimed in claim 3, wherein the depressions have a dropping ramp and a rising ramp.

5. The axle-drive block as claimed in claim 2 or 3, wherein the dropping ramp and the rising ramp have different inclinations.

6. The axle-drive block as claimed in claim 1, further including first and second clutch disks between the first frictional surface and the second frictional surface, wherein the first clutch disks are connected in a rotationally fixed manner to the inner wall of the housing and the second clutch disks are connected in a rotationally fixed manner to the ring.

7. The axle-drive block as claimed in claim 1, wherein one of the frictional surfaces has a friction lining.

* * * * *